US011548232B2

(12) United States Patent  (10) Patent No.: US 11,548,232 B2
Jaster  (45) Date of Patent: Jan. 10, 2023

(54) METHOD OF MANUFACTURING ISOTROPIC PARTS UTILIZING ADDITIVE MANUFACTURING METHODS

(71) Applicant: Mark Jaster, Rexburg, ID (US)

(72) Inventor: Mark Jaster, Rexburg, ID (US)

(73) Assignee: Element 7, LLC, Rigby, ID (US)

( * ) Notice: Subject to any disclaimer, the term of this patent is extended or adjusted under 35 U.S.C. 154(b) by 474 days.

(21) Appl. No.: 16/224,878

(22) Filed: Dec. 19, 2018

(65) Prior Publication Data
US 2020/0198249 A1  Jun. 25, 2020

(51) Int. Cl.
| | |
|---|---|
| *B29C 64/00* | (2017.01) |
| *B29C 64/40* | (2017.01) |
| *B29C 64/118* | (2017.01) |
| *B29C 64/153* | (2017.01) |
| *B29C 64/209* | (2017.01) |
| *B22F 5/00* | (2006.01) |
| *B29C 39/02* | (2006.01) |
| *B22F 10/20* | (2021.01) |
| *B33Y 99/00* | (2015.01) |
| *B29C 64/176* | (2017.01) |
| *B29C 64/245* | (2017.01) |
| *B29C 64/20* | (2017.01) |
| *B29C 64/227* | (2017.01) |

(Continued)

(52) U.S. Cl.
CPC .............. *B29C 64/40* (2017.08); *B22F 5/007* (2013.01); *B22F 10/20* (2021.01); *B29C 39/02* (2013.01); *B29C 64/00* (2017.08); *B29C 64/10* (2017.08); *B29C 64/118* (2017.08); *B29C 64/153* (2017.08); *B29C 64/176* (2017.08); *B29C 64/182* (2017.08); *B29C 64/20* (2017.08); *B29C 64/205* (2017.08); *B29C 64/209* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B33Y 40/10* (2020.01); *B33Y 40/20* (2020.01); *B33Y 50/00* (2014.12); *B33Y 70/00* (2014.12); *B33Y 99/00* (2014.12); *B33Y 10/00* (2014.12); *B33Y 30/00* (2014.12); *B33Y 40/00* (2014.12); *B33Y 80/00* (2014.12)

(58) Field of Classification Search
CPC ................................ B29C 64/30; B33Y 10/00
See application file for complete search history.

(56) References Cited

U.S. PATENT DOCUMENTS 5,824,260 A * 10/1998 Sauerhoefer .......... B29C 70/745
264/401
2003/0186042 A1* 10/2003 Dunlap ................. B29C 70/745
428/304.4

(Continued)

OTHER PUBLICATIONS https://www.reddit.com/r/3Dprinting/comments/3hewrd/has_anyone_tried_filling_hollow_parts_with/ (Year: 2015).*

(Continued)

*Primary Examiner* — Nicholas R Krasnow
(74) *Attorney, Agent, or Firm* — Ascentage Patent Law, LLC; Travis Lee Johnson

(57) ABSTRACT

A fabrication method involving the use of additive material fabrication methods to create a shell representative of a desired part, the additive material shell being used in one or more molding fabrication methods in which a second material is provided into a cavity of the shell.

8 Claims, 14 Drawing Sheets

(51) Int. Cl.
    *B29C 64/307* (2017.01)
    *B29C 64/182* (2017.01)
    *B29C 64/30* (2017.01)
    *B33Y 40/20* (2020.01)
    *B29C 64/205* (2017.01)
    *B29C 64/255* (2017.01)
    *B33Y 50/00* (2015.01)
    *B33Y 40/10* (2020.01)
    *B29C 64/10* (2017.01)
    *B33Y 70/00* (2020.01)
    *B29C 64/25* (2017.01)
    *B33Y 80/00* (2015.01)
    *B33Y 10/00* (2015.01)
    *B33Y 30/00* (2015.01)
    *B33Y 40/00* (2020.01)

(56) References Cited

U.S. PATENT DOCUMENTS

| | | | | |
|---|---|---|---|---|
| 2009/0014907 A1* | 1/2009 | Kuo | ............. | B29C 33/565 264/220 |
| 2012/0258250 A1* | 10/2012 | Rodgers | ............. | B33Y 10/00 427/402 |
| 2015/0321434 A1* | 11/2015 | Sterman | ............. | B33Y 80/00 264/255 |
| 2016/0067918 A1* | 3/2016 | Millar | ............. | B29C 64/106 425/375 |
| 2016/0122541 A1* | 5/2016 | Jaker | ............. | B29C 64/106 525/392 |
| 2016/0221266 A1* | 8/2016 | Cronin | ............. | G05B 19/4099 |
| 2018/0243984 A1* | 8/2018 | Hayashida | ............. | B29C 64/209 |
| 2020/0086555 A1* | 3/2020 | March | ............. | B28B 1/001 |
| 2020/0114581 A1* | 4/2020 | Wilk | ............. | B29C 64/30 |
| 2022/0049521 A1* | 2/2022 | Turnquist | ............. | E04G 21/0463 |

OTHER PUBLICATIONS https://www.reddit.com/r/3Dprinting/comments/3hewrd/has_anyone_tried_filling_hollow_parts_with/ (Note: Replacement PDF. Document filed on Aug. 10, 2021 appears corrupt.) (Year: 2015).*

Reddit 2016, see username: "Milkdrunk" commentary within the 3D printing discussion forum https://old.reddit.com/r/functionalprint/comments/5ak3w2/annealing_pla_in_an_oven_substantially_increases/d9h94bg/ (Year: 2016).*

* cited by examiner

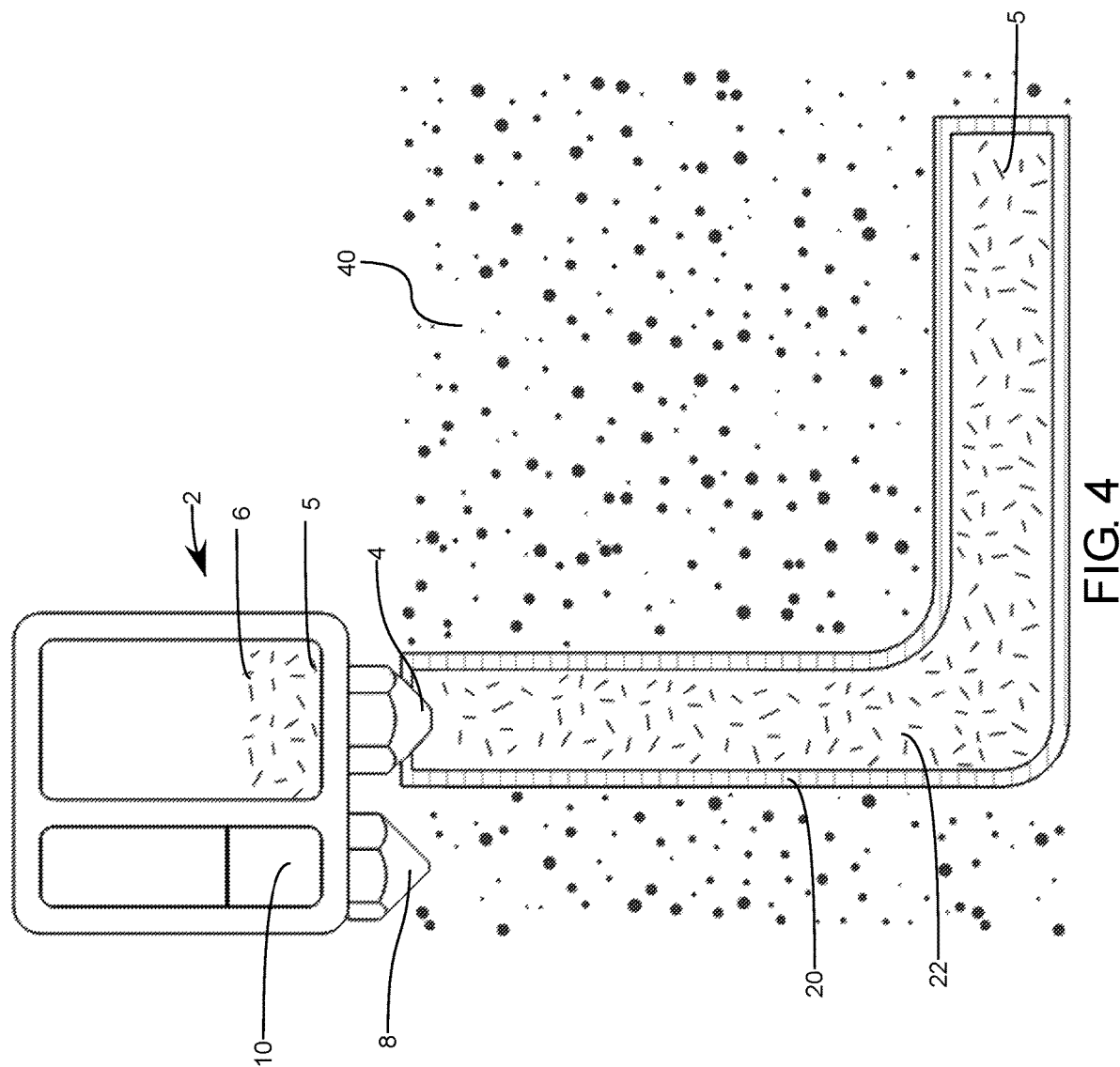

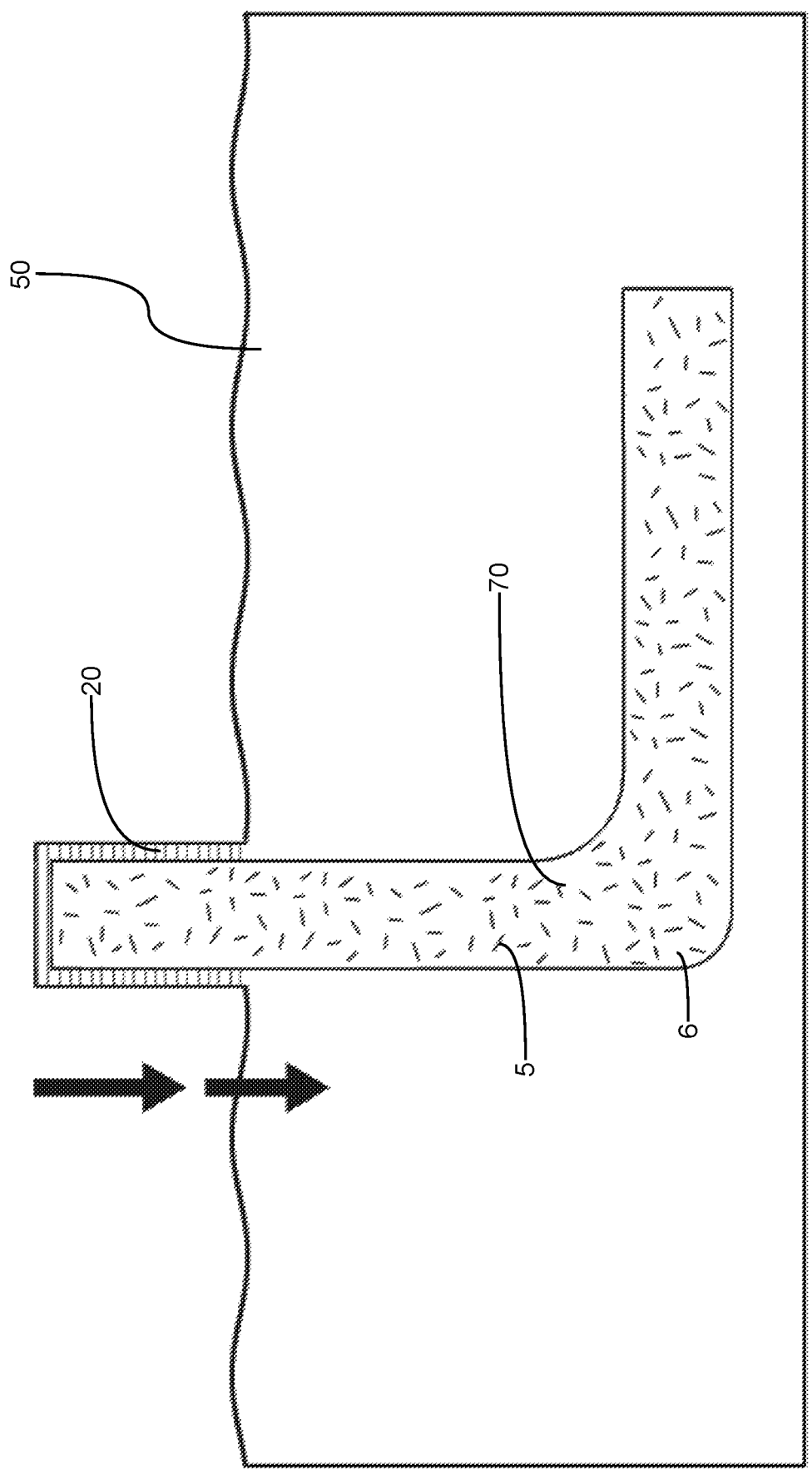

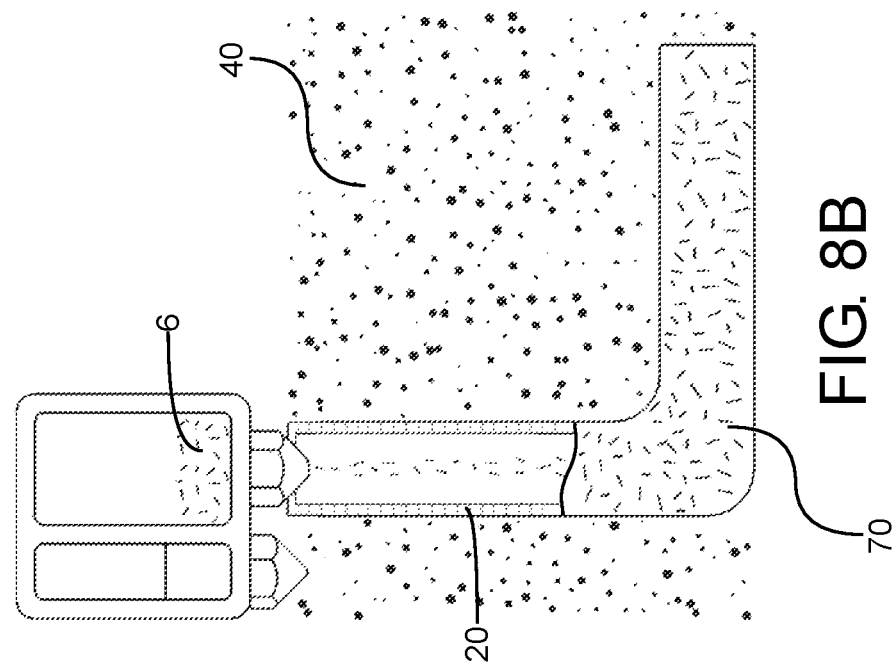
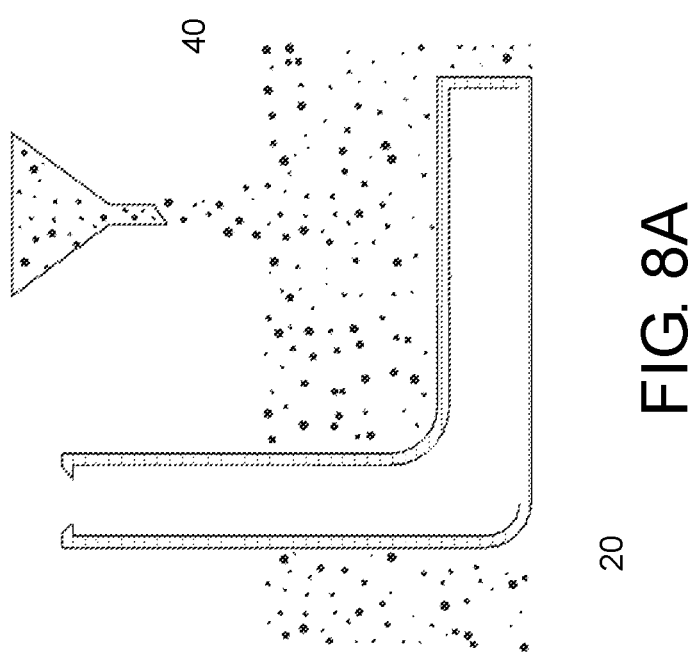
FIG. 8B
FIG. 8A

METHOD OF MANUFACTURING ISOTROPIC PARTS UTILIZING ADDITIVE MANUFACTURING METHODS

COPYRIGHT STATEMENT

A portion of this patent application document contains material that is subject to copyright protection including the drawings. The copyright owner has no objection to the facsimile reproduction by anyone of the patent document or the patent disclosure as it appears in the Patent and Trademark Office file or records, but otherwise reserves all copyright rights whatsoever.

BACKGROUND

Field of the Invention and Related Art

The present invention relates generally to rapid fabrication and particularly to additive material fabrication of parts.

Presently there exists a gap between the world of additive material fabrication and fabrication methods typically used in mass production, namely injection molding, and die casting of parts, particularly where large numbers of identical parts are being fabricated. Additive material fabrication has historically dealt with thermoplastic materials such as polymers, plastics, resins, etc. While additive material methods have been used with some success in metallic applications, the process has proved slow and therefore incompatible with mass production.

One of the major hurdles for manufacturers reaching the production stage of a new part or item is that the dies, molds, or other machinery used in creating these molding parts are prohibitively expensive as the design and fabrication of these molding parts are extremely difficult.

Additionally, as additive material manufacturing typically involves the addition of numerous layers of material being bonded together, inter-laminar failures can occur between each layer. Further, parts made by additive material processes typically exhibit some degree of warping as the part's particular properties may vary along different planes throughout the part. Yet another failure of additive material is that the material itself cannot be provided with randomized curing orientations, nor can fibers be introduced which extend across multiple planes throughout the part so as to make isotropic parts.

Additional problems with additive material fabrication include speed, i.e. current additive material processes are relatively slow throughout the entire print, particularly as compared to injection molding. Also, additive material processes are limited to materials that can be precisely metered and extruded with the fused deposition modeling (FDM) processes or limited to thermosetting materials for stereo lithography (SLA) processes.

In some of these additive material processes, printing or fabricating with more than one material and/or composite is not yet possible. Additive material is also limited with regard to powder materials for thermoplastic and metallic powder bed processes.

The present invention seeks to overcome many of the deficiencies presently existing in injection molding fabrication and additive material fabrication systems. Some such advantages will be discussed in more detail below.

SUMMARY

In order to overcome these and other disadvantages the present invention and various aspects thereof can include a fabrication method wherein various steps are implemented during the fabrication of an item, the steps including: fabricating a physical hollow shell utilizing a first material by utilizing an additive material process; filling the physical hollow shell with a second material, the second material will typically have differing characteristics from the first material, the second material being initially provided to the interior of the physical hollow shell in a flowable form. Where appropriate the second material can be caused or allowed to solidify into a desired part. Ultimately, in some embodiments, the method can include a step of removing the physical hollow shell from the second material after solidification is complete so as to expose the desired part.

In some such embodiments, the fabrication method can also include a step of creating a hollow shell computer model, the hollow shell model having an interior surface representing an exterior surface of the desired part, wherein the physical hollow shell is formed so as to represent the hollow shell computer model.

In some embodiments, one or more structural reinforcement structures can be suspended within the second material while in the flowable or liquid form. In these exemplary embodiments, the structural reinforcement structures can include extended fibrous filaments, metallic wires, rods, mesh, etc.

In some embodiments, the fabrication method can also include a step of providing a support material about an exterior of the physical hollow shell.

In some additional embodiments, the step of removing of the physical hollow shell can be performed by dissolving the first material by utilizing a solvent, the solvent being configured to dissolve the first material while being non-reactive with the second material.

It will be understood that the formation of the physical hollow shell can be performed utilizing a plurality of various methods, as will be appreciated by those having skill in the art of 3-D printing or other additive material processing, such methods can then include providing and bonding a helix of continuously fed filament, sintering of powdered materials, curing, drying, helical extrusion, heat bonding, melting, ultraviolet curing, or any other additive material fabrication method as appreciated by those having skill in the art.

In some embodiments, the method can include the step of providing an injection nozzle which is configured to inject the second material into the physical hollow shell. In some such embodiments, the method can also include a step of forming an injection port onto the physical hollow shell and subsequently pressing an injection nozzle into the injection port, the injection port corresponding in shape to the injection nozzle, wherein pressing the injection nozzle into the injection port can then be configured to form a seal between the injection nozzle and the injection port.

Also contemplated herein is an alternative fabrication method, wherein the method can include the following steps: creating a physical hollow shell utilizing an additive material process; providing a support material about an exterior of the physical hollow shell; filling the support material with a second material, the second material being provided in a flowable or liquid form, wherein the second material when in the flowable form destroys the first material; allowing the second material to solidify within a cavity formed within the support material, the cavity having been formed by the first material; and removing the solidified second material from the hollow shell.

Similarly, this embodiment can also include a step of creating a hollow shell computer model, the hollow shell model having an interior surface representing an exterior surface of the desired part, wherein the physical hollow shell is formed so as to represent the hollow shell computer model.

Yet another embodiment can include a fabrication method which includes the following steps: creating a solid model of a desired part; converting the solid model to a hollow shell assembly model, the hollow shell assembly model having an exterior surface representing an exterior surface of the desired part; creating a hollow shell using additive material processes based on the hollow shell assembly model; providing a support material about an exterior of the hollow shell; solidifying the structure of the support material; selecting a compatible sacrificial material which is also capable of being utilized for additive material fabrication; filling the support material with the second material in the flowable form; and allowing the product material to solidify. In these embodiments, the hollow shell can either be burned or dissolved away, or alternatively, the sacrificial hollow shell material can be integrated into a final part forming an alloy or be otherwise absorbed by the second material.

BRIEF DESCRIPTION OF THE DRAWINGS

FIG. 4 illustrates a side cross-sectional view of an exemplary physical shell of an exemplary desired part illustrative of various concepts in accordance with various aspects of the present invention having been formed in an exemplary granular support material;

FIG. 5 illustrates a side cross-sectional view of an exemplary physical shell removal process from an exemplary desired part illustrative of various concepts in accordance with various aspects of the present invention;

FIGS. 8A-B illustrate side cross-sectional views of an alternative exemplary process for fabricating a desired part utilizing a sacrificial physical shell being illustrative of various concepts in accordance with various aspects of the present invention.

DETAILED DESCRIPTION OF THE VARIOUS EMBODIMENTS

Figure 1A:
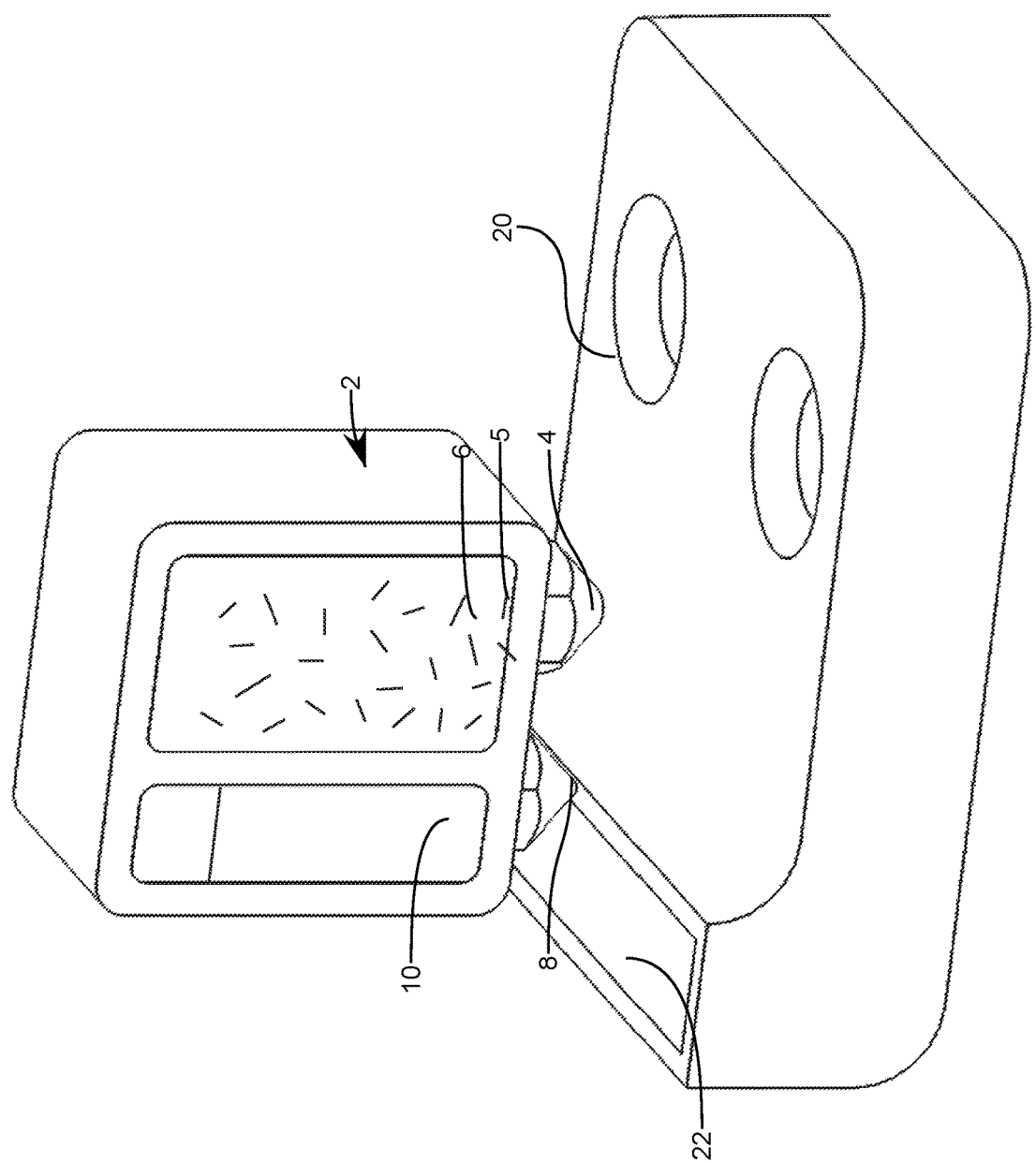
FIGS. 1A-D illustrate perspective side and cross-sectional views of various steps of forming an exemplary physical shell of an exemplary desired part illustrative of various concepts in accordance with various aspects of the present invention.
Figure 1B:
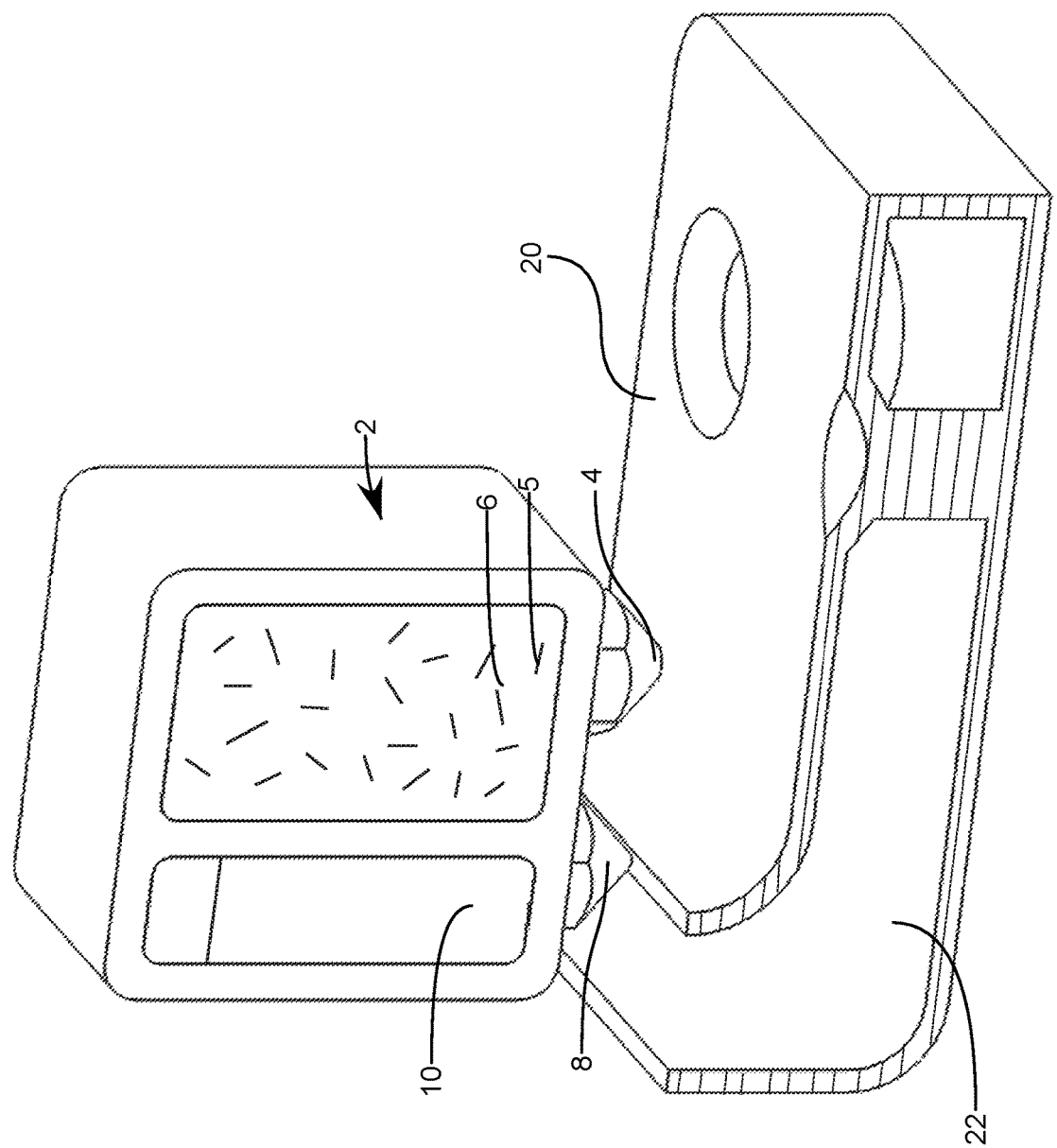
Figure 1C:
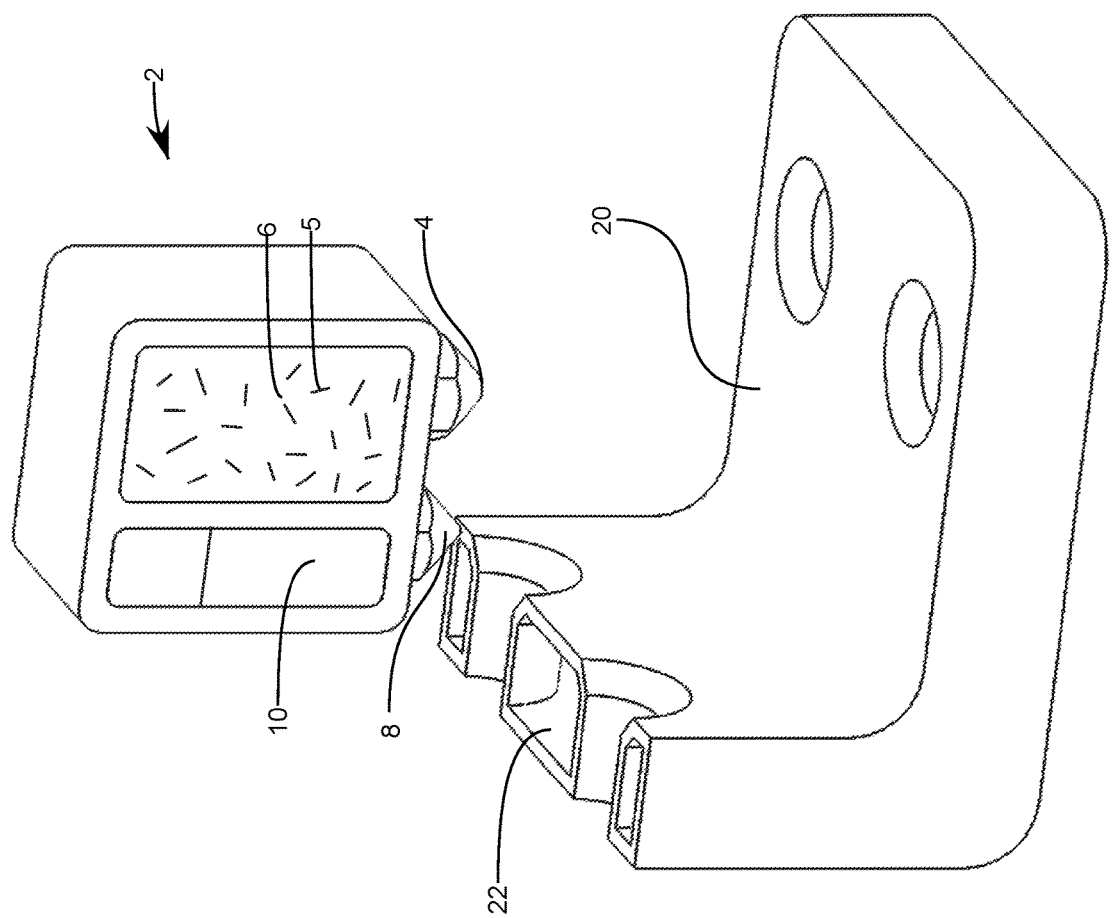
Figure 1D:
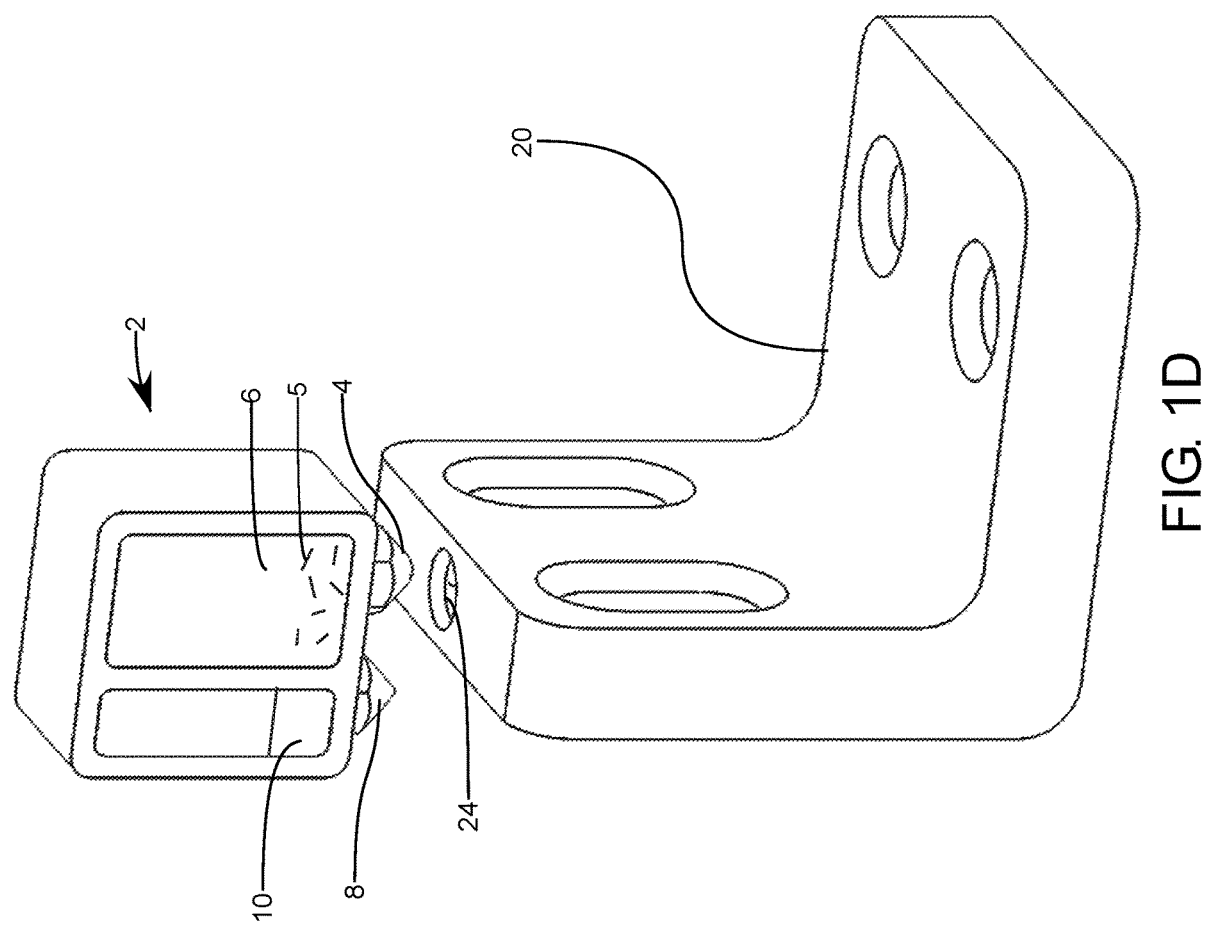
Figure 2:
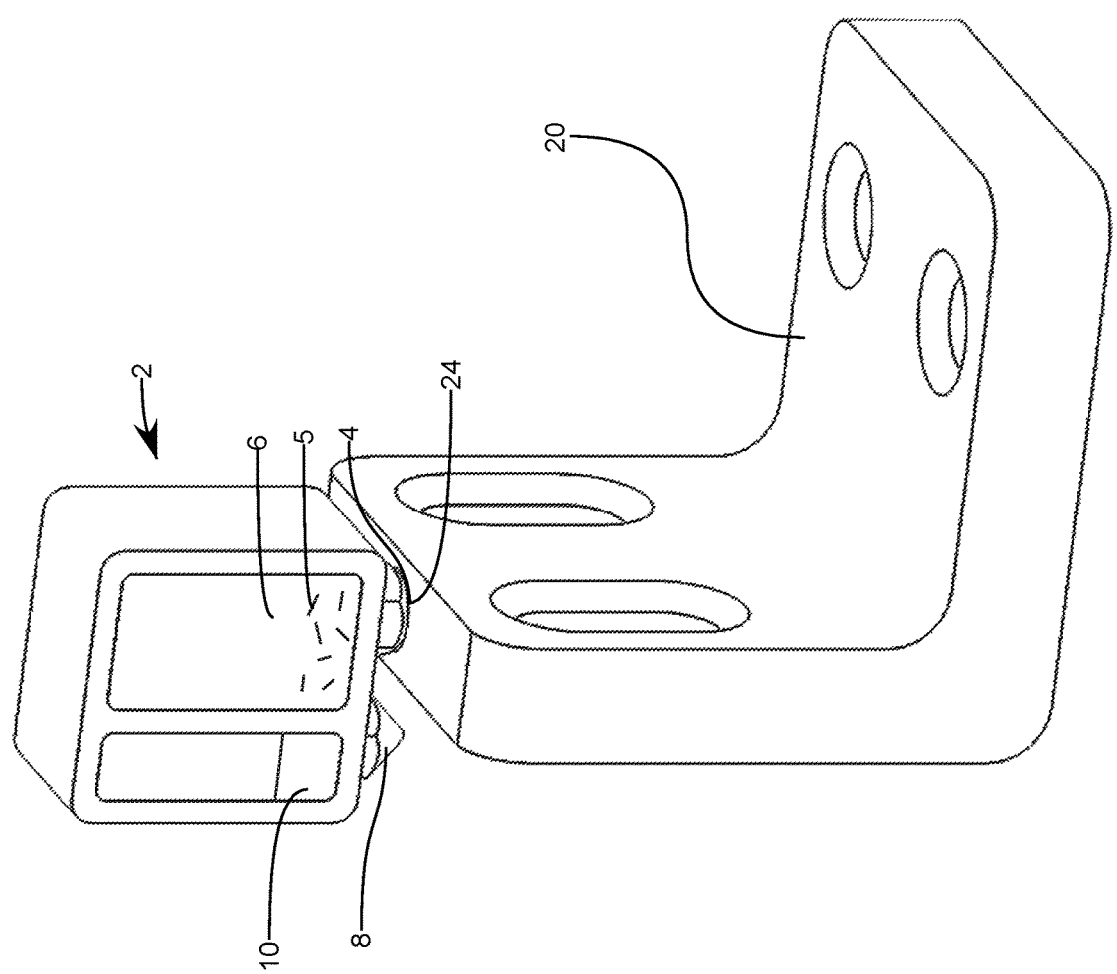
FIG. 2 illustrates a perspective view of an exemplary filling process of an exemplary physical shell of an exemplary desired part illustrative of various concepts in accordance with various aspects of the present invention.
Figure 3A:
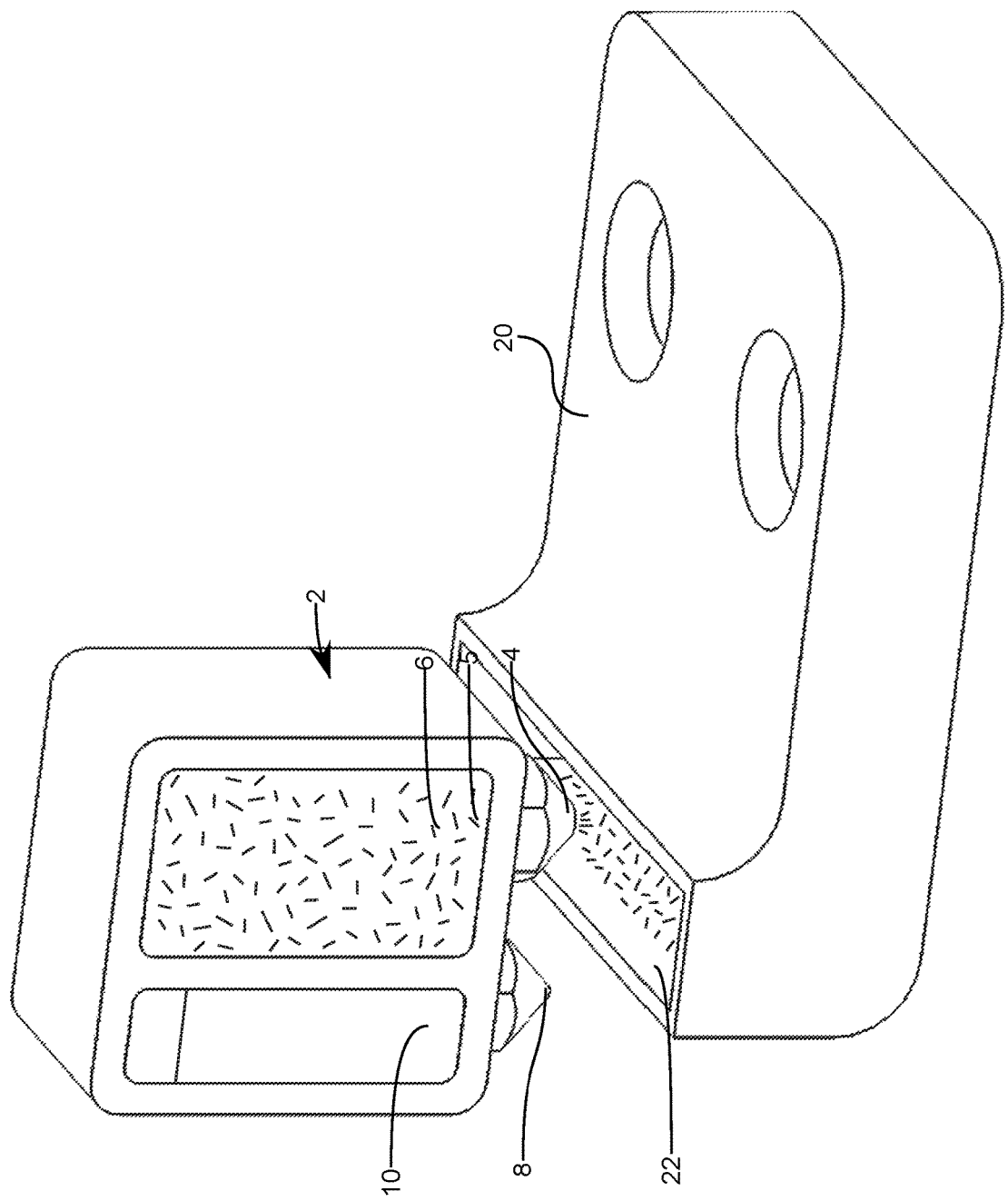
FIGS. 3A-C illustrate perspective side and cross-sectional views of an alternative filling process of an exemplary physical shell of an exemplary desired part illustrative of various concepts in accordance with various aspects of the present invention.
Figure 3B:
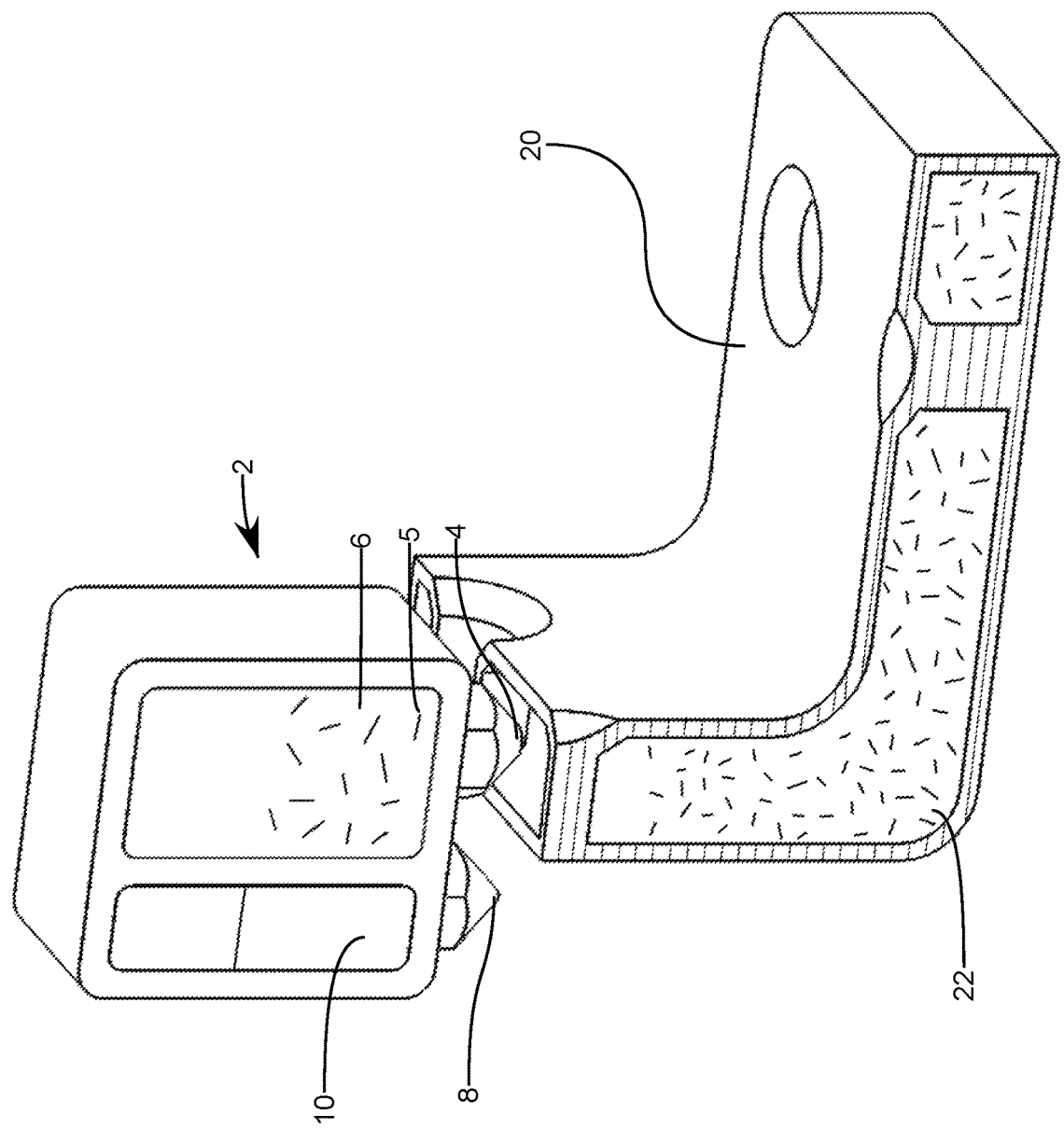
Figure 3C:
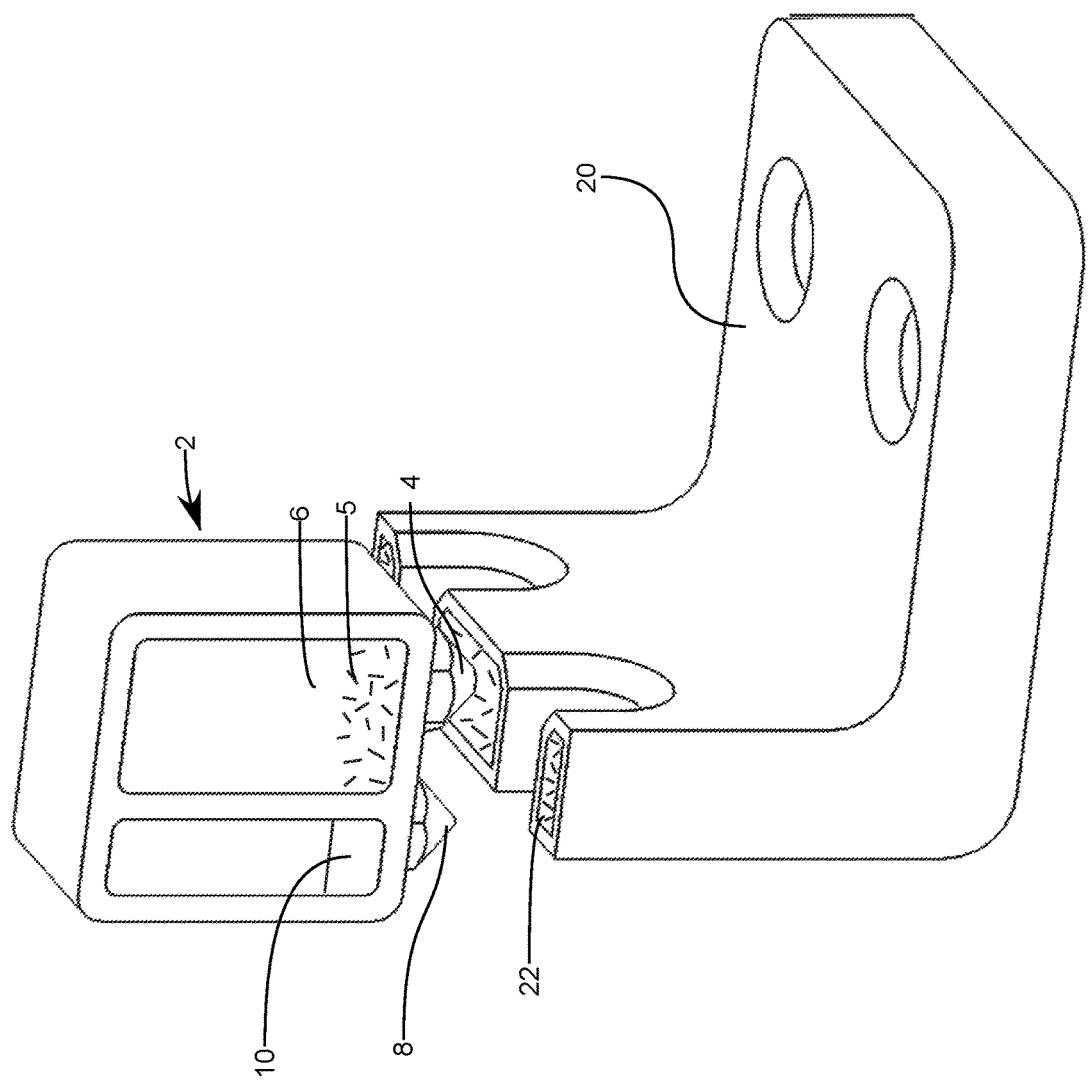
Figure 6:
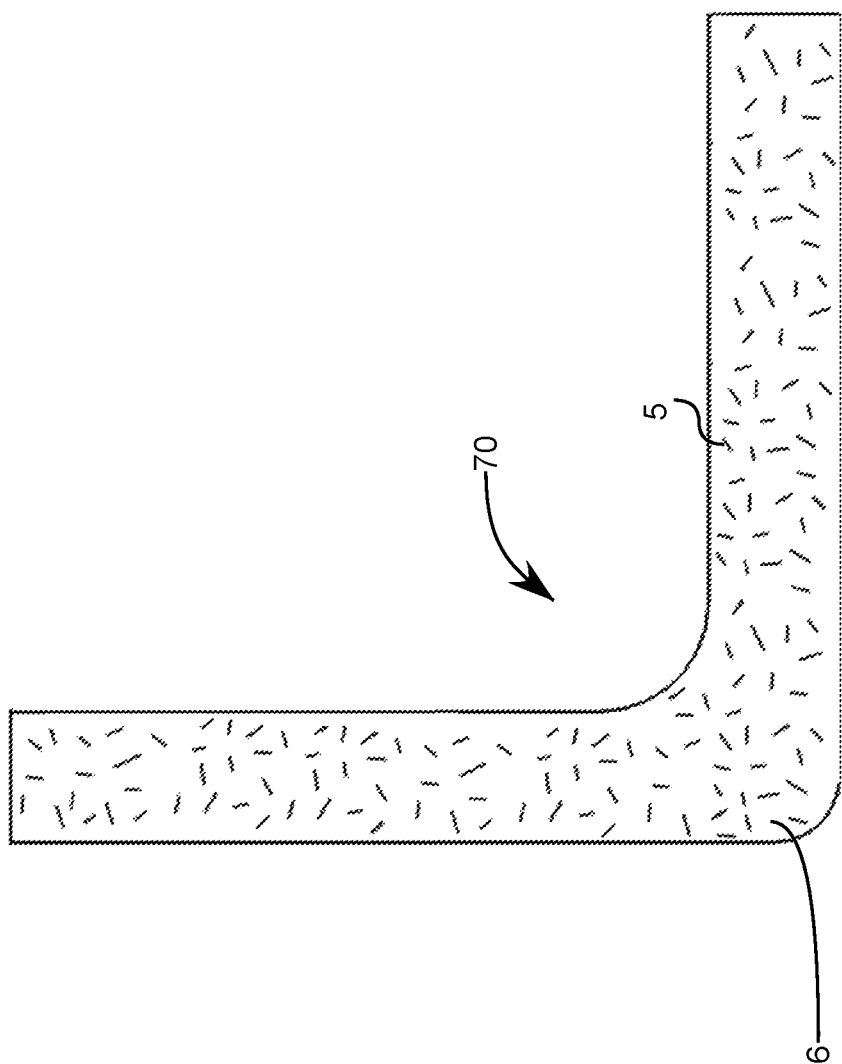
FIG. 6 illustrates a side cross-sectional view of an exemplary desired part having the physical shell being removed being illustrative of various concepts in accordance with various aspects of the present invention surrounded by a biasing or support material.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "horizontal" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As such, contemplated herein are various methods for utilizing additive material fabrication in combination with investment casting, injection molding, pour molding, or virtually any other molding fabrication method.

As discussed briefly above, one of the major advantages of mold type fabrication methods is that after a permanent mold is fabricated the molds can typically be used numerous times in order to create hundreds, or even thousands of parts in thousands of cycles prior to the molds themselves wearing out thus allowing cost of an individual part to be driven down substantially.

Meanwhile additive material fabrication, while allowing for particularly complex and otherwise impossible to fabricate geometries, has been burdened due to time constraints particularly in mass production operations because of the time it takes for each added layer of material to cure, which time renders it incapable of competing with the mass production of injection or pour type fabrication methods.

The present invention seeks to utilize additive material fabrication methods in order to create molds for use in pour or injection type fabrication methods.

It will be appreciated that some of the major disadvantages to additive material fabrication is, as discussed above, that reinforcement between the various layers has not as yet been possible, or at least greatly limited, that fabrication utilizing various materials has not yet been possible using additive material, and that the constraints due to depositing, curing, or solidifying, or system complexity, of each individual layer has been prohibitive in mass production.

In order to overcome these and other disadvantages, the present invention and various aspects thereof can include a fabrication method wherein various steps are implemented during the fabrication of an item. As shown in FIGS. 1A-D the steps can include an additive material process of fabricating a physical hollow shell 20. The process of forming the physical hollow shell is performed utilizing a first material 10 by through an additive material process. It will be appreciated that the additive material process means is illustrated herein as an extrusion nozzle 8, but this is illustrated for exemplary purposes only and can be performed utilizing any number of additive fabrication methods as will be appreciated by those having skill in the art.

It will also be appreciated that while the FIGS. accompanying this disclosure illustrate a unitary nozzle assembly 2, that the various nozzles for providing the first and second materials can also be separate and distinct, and that the unitary nozzle assembly as illustrated herein is shown and discussed for exemplary purposes only but can be utilized to dispense one or more materials having varying properties from one or more depositing means, i.e. nozzles, or in varying or alternative machines which can each be configured to provide various steps of fabrication, functions, etc.

It will be appreciated that additive material processes are very good at forming thin outlines or shells and can thus create the physical shell having an extremely thin sidewall which then reduces the amount of waste or material which will be discarded or destroyed through the fabrication process and upon revealing the final product. Once the physical shell is created it can then be filled with a second material 6, the second material 6 will typically have differing characteristics from the first material. For example, a different melting point, higher strength, dissolve in alternative materials, i.e. acids or solvents.

These differing characteristics will allow the first material to be more easily separated from the second material so as to reveal the final part, which in this embodiment is formed of the second material. It will be appreciated that the characteristics may also differ in ways so as to create alloys, or provide various degrees of structural support or any number of advantageous characteristics as will be appropriate for a particular application or function of the physical shell 20, various examples of which will be discussed in more detail below.

It will be understood that it will be advantageous to initially provide the second material 6 to the interior of the physical hollow shell in a flowable or liquid form, which can include granular or powdered structures, such that it can flow and completely fill a cavity 22 formed by the physical shell 20. Subsequently, the method can include an additional step of allowing the final material to solidify into a desired part 70 being formed of the second material 6. In some instances, such as where the physical shell has an interior surface defining the exterior surface of the final part, the method can then include a step of removing the physical hollow shell 20 from the second material 6 after solidification is complete so as to expose the desired part 70.

It will also be appreciated that various computer modeling steps and prototyping are contemplated herein, wherein in some embodiments, the inventive method can include a step of creating a hollow shell computer model, the hollow shell model having an interior surface representing an exterior surface of the desired part, wherein the physical hollow shell is formed so as to represent the hollow shell computer model. These models can then be manipulated so as to accommodate any number of additive fabrication methods, such as fusing, sintering, etc., so as to properly describe a tool path for the proper additive fabrication process.

In some embodiments, one or more structural reinforcement structures 5 can be suspended within the second material 6 while in the flowable or liquid form. In these exemplary embodiments, the structural reinforcement structures can include extended fibrous filaments, metallic wires, rods, mesh, etc. Suspended elements can also be added separately from another nozzle to the fill material such that they mix within the shell.

In some embodiments, the fabrication method can also include a step of providing a support material 40 about an exterior of the physical hollow shell.

In some additional embodiments, and as illustrated in FIG. 5 the step of removing of the physical hollow shell can be performed by dissolving the first material by utilizing a solvent, the solvent being configured to dissolve the first material while being non-reactive with the second material.

It will be understood that the formation of the physical hollow shell can be performed utilizing a plurality of various methods, as will be appreciated by those having skill in the art of 3-D printing or other additive material processing, such methods can then include providing and bonding a helix of continuously fed filament, sintering of powdered materials, curing, drying, helical extrusion, heat bonding, melting, ultraviolet curing, or any other additive material fabrication method as appreciated by those having skill in the art.

In some embodiments, the method can include the step of providing an injection nozzle 4 which is configured to inject the second material into the physical hollow shell. In some such embodiments, the method can also include a step of forming an injection port 24 onto the physical hollow shell 20 and subsequently pressing an injection nozzle 4 into the injection port 24, the injection port 24 corresponding in shape to the injection nozzle 4, wherein pressing the injection nozzle into the injection port can then be configured to form a seal between the injection nozzle and the injection port.

Figure 9A:
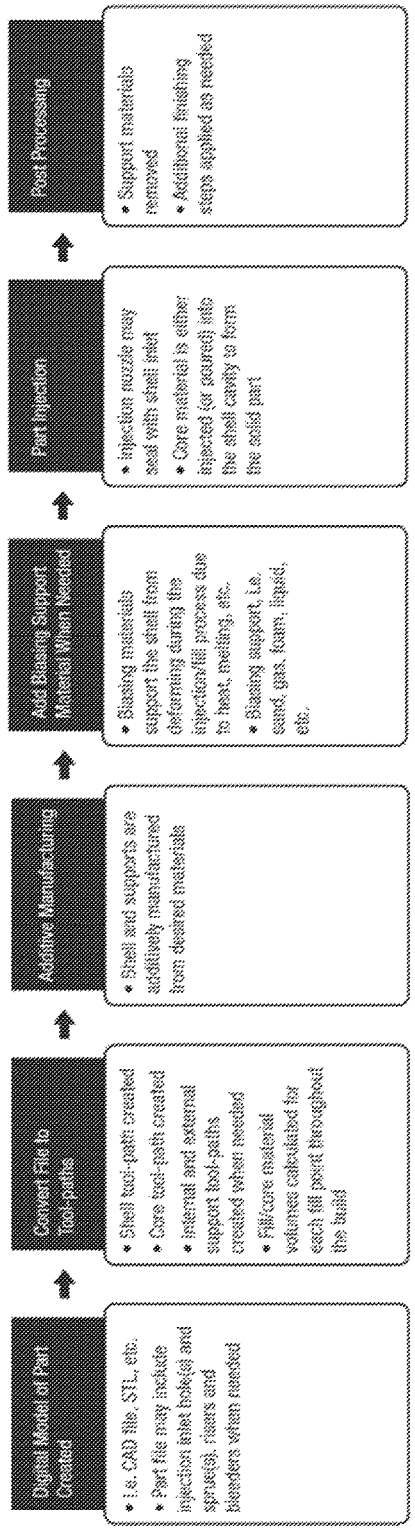
FIGS. 9A-B illustrate various exemplary flow charts illustrating various method steps illustrative of one or more concepts in accordance with various aspects of the present invention.
Figure 9B:
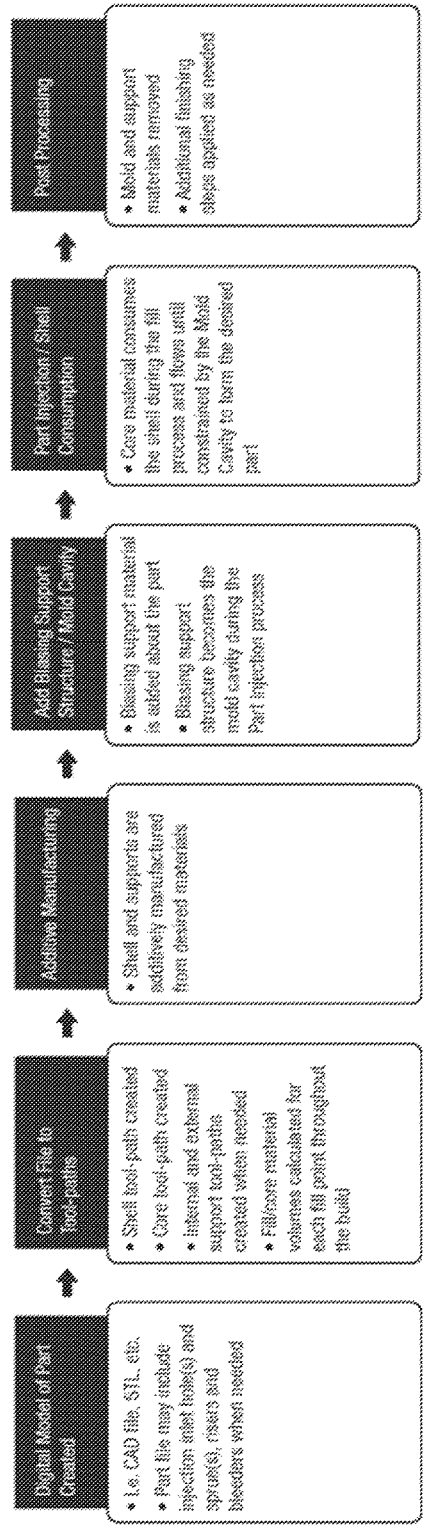

As illustrated in FIGS. 9A-B, illustrating exemplary method flowcharts 100A and 100B respectfully, yet another embodiment of the present invention can include a fabrication method, wherein the method includes the following steps: creating a solid model of a desired part; converting the solid model to a hollow shell assembly model, the hollow shell assembly model having an exterior surface representing an exterior surface of the desired part; creating a hollow shell using additive material processes based on the hollow shell assembly model; providing a support material about an exterior of the hollow shell such as sand or other casting material, the support material having any number of desired properties; solidifying the structure of the support material; selecting a compatible sacrificial material which is also capable of being utilized for additive material fabrication; filling the support material with the second material in flowable form; and allowing the product material to solidify. In these embodiments, the hollow shell can either be burned or dissolved away Alternatively, the hollow shell material can be integrated into a final part forming an alloy or be otherwise absorbed by the second material.

Figure 7B:
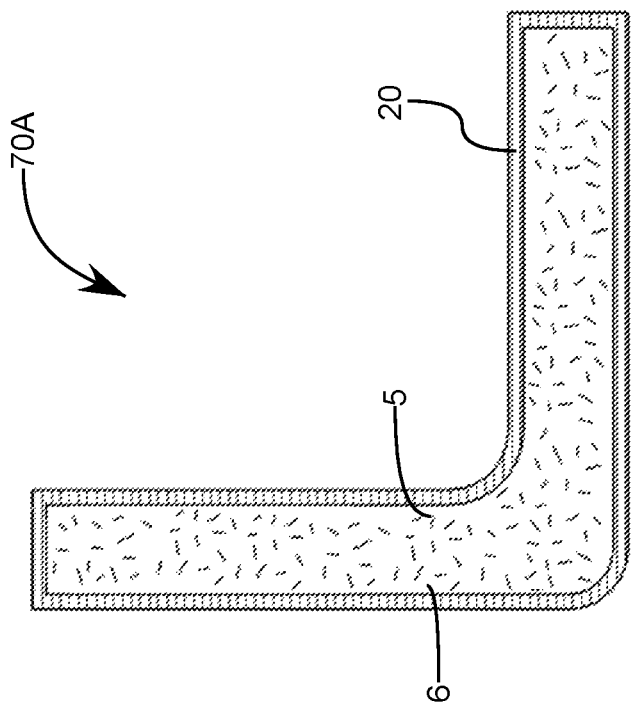
FIGS. 7A-B illustrate side and side cross-sectional views of an alternative exemplary desired part illustrative of various concepts in accordance with various aspects of the present invention wherein the physical shell forms part of the final desired part.
Figure 7A:
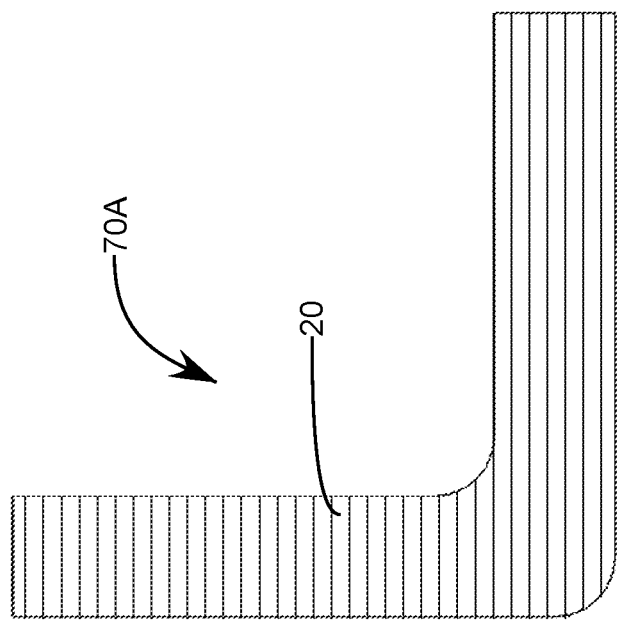

In yet additional embodiments, as the hollow shell 20 can have an exterior surface defining the final part, the hollow shell 20 can be left over the second material 6 and the hollow shell 20 and the second material 6 can together form the final desired part 70A, as illustrated in FIGS. 7A-B. In some such embodiments, the varying properties of the first and second materials can provide benefits one to another. For purposes of example, the first material 10 could be a corrosion resistant, insulative, electrically conductive, etc., material which can be easily fabricated through an extrusion, melting, or curing process, but the second material could be an alternative material having a desired strength profile but need to work in an environment which requires it to be properly encased. As such, instead of utilizing an overmolding process, which can be particularly imprecise, the process of the present invention can then be utilized to form the desired part having precise tolerances and still having the desired final material properties.

It will be understood that, where appropriate, the shell can be removed via numerous chemical processes, melting, burning, sandblasting, etc. depending on the material used for the shell, so as to leave the interior of the cast free for injection or pour molding. In particular, FIG. 5 illustrates a process in which the desired part 70 being encased by the shell 20 can be dipped into a solvent bath 50 so as to remove or dissolve the physical shell, thus leaving only the desired part contained therein.

It will be appreciated that in some instances the shell can be separable for removal from a particular support material 40. In this manner, a single shell can be utilized to form a plurality of casts within a support material, and thus be used to form subsequent molded parts based on the shell. Additionally, a single shell can be used to form numerous sacrificial molds or in various processes in which the shell itself is destroyed upon removal of the final part therefrom. Further, a new shell and corresponding mold can accordingly be formed for each part.

It will be appreciated by those having skill in the art that removal of casting material from the final part can be accomplished using various methods, including shaking or jarring the part to dislodge a sandy or otherwise granular support or biasing material forming the cast. In some instances, the shell can remain within the cast and be formed of a sacrificial material which is removed prior to pouring or injection, or alternatively melted or otherwise dissolved in the injection or pouring process. In some such instances, the shell material can be incorporated into a final alloy, or composite material. In yet additional embodiments, the shell can be configured to remain intact and act as a seal, coating, etc. around the exterior of the final part, i.e. a cladding for low melting point alloys. For example, a low friction polyethylene could be provided as an exterior shell with a rougher or even metallic interior material being injected within the shell so as to provide more substantial structural support or rigidity.

It will be further appreciated that the shell can be formed of the same material as the final fill material, a different material, or a similar material all depending on final part specifications or desired attributes.

It will be appreciated that in addition to sand or ceramic materials, other support or casting materials can be used such as silicone, metal shavings, powders, etc., which are later sintered together, adhesives, polymers, or virtually any conceivable molding cast material can be used in accordance to this method. It will be appreciated that the support material or casting materials can be configured to provide structural support or strength to the shell, particularly when the shell includes intricate parts, or is intended to resist expansion or contraction of the part material during curing. In yet additional embodiments, a portion of the support or casting materials can be configured to be partially consumed so as to produce a desired alloy or composite of material. Additionally, the support material or cast material can be selected based on a desired cooling property or conduction properties so as to achieve a desired cooling rate of the final part material being injected or poured into the shell.

In other alternative embodiments, the shell can be created in a manner such that the interior surface of the shell can be fabricated so as to represent the exterior surface of the desired part, wherein the shell itself acts as the mold. It will be recognized that various curing and solidification methods are allowing for the use of numerous materials in additive manufacturing. For example, ceramics, polymeric plastics, resins, etc. It will then be appreciated that an appropriate material can be selected for a wide variety of injectable or pourable materials being used in said mold. While certain plastics and polymers can be suitable for use as integrated shells for use with other plastics or polymers, they will not typically be useful for molten metals, while advancements in ceramic printing are now allowing for additive manufacturing using ceramics which would be suitable for use with molten metals. However, it will be appreciated that certain low melting point alloys exist which would allow for casting into a polymer shell with a high melting point. Or, alternatively, certain polymers can be used as sacrificial shells for use with high melting point metallic processes.

Additionally, sprues and risers can be printed directly into shell along with reliefs provided for venting of gasses contained in the mold to allow for escape of gasses upon injection or pouring of the desired part material. It will be further appreciated that various separation points, internal supports or other necessary mold features can be created in otherwise difficult or previously impossible locations through the use of the additive material fabrication of the shell.

It will be appreciated that the shell of a part can be fabricated, particularly using additive material fabrication, in a greatly reduced amount of time as compared to a complete part. This being because the exterior shell portion of a part takes the same amount of time to cure as the interior portions of that same part. As such the amount of material to be cured, dried, etc. can be reduced in a relationship mirroring the surface area to volume ratio of any desired part. In certain instances, the shell can have less than 1% of the overall volume depending on the required thickness of the shell. The required thickness varying depending on the material and utilization of the shell and the complexity of the part. For example, a substantially planar part will be able to utilize a shell being substantially thinner than a multiaxial and three-dimensionally complex part or with thin interconnecting structures or pieces forming such a part.

Additionally, the strength of the support or cast material can be taken into account for purposes of accuracy and minimization of deformation caused by the pressure thereof.

It will be appreciated that in the fabrication methods discussed above, that reinforcement fibers or structures 5 can be provided or otherwise suspended within the injected or poured second material such that the reinforcement fibers or structures extend multi-axially throughout the part thus increasing strength and eliminating deficiencies of interlaminar failure, i.e. wherein the bonds between each printed layer fail, which has been so prevalent in additive material fabrication methods to date. As such, these methods allow for the creation of an isotropic part having fibers or dendritic arms from phase change which extend multi-axially throughout the part while the details or exterior surfaces of the part can be formed through a relatively fast, as compared to a typical mold tooling processes, via an additive material fabrication process. Wherein the time for fabrication is reduced because a shell can be additive material fabricated, i.e. printed, relatively quickly, but the main body of the material forming the part can be formed in one single injection or pouring step from a single material or alternatively in a stepped injection process so as to reduce the effects of thermal or mechanical shrinkage or expansion.

The processes of the present invention also increase the amount of tailoring possible with respect to material compatibility issues between the material being poured into the investment cavity and either defined or maintained by the additive material fabricated shell.

Another benefit realized is that these processes eliminate the need to preheat the shell/mold cavity prior to pouring, because strength is derived from the support material rather than the shell alone. Further, the support material can better support and define the shell and prevent cracking of the shell during the metal pour. In addition, the part can be injected or poured in different stages using different materials and/or times between stages so as to reduce the distortion, or change the curing, etc.

It will be appreciated that many of the benefits realized from the methods described herein include an ability to cross-link material between layers so as to increase strength. The method is also adaptable for use with high-temperature materials systems. Additionally, a single machine can be adapted which is capable of performing both processes of printing the shell/mould/cavity and then filling it.

In some embodiments, the system and method can overcome shrink/expanding issues common in other moulding processes by partially filling the part mid-print then allowing the material to shrink/expand before adding the next volume of filling material (In-situ molding throughout the print)

Additionally, the methods disclosed herein eliminate the steps of having to remove the mould and then put it into another machine for the filling operation. The method and systems also allow for maintaining high resolution and surface finish on the outer visible layers.

In addition, in certain embodiments, final parts will no longer need to be designed with draft angles for mould removal as they do with other molding processes.

In various embodiments, the support materials can be configured to bias not only support overhangs and prevent bulging of shells, but also provide thermal insulation to decrease warping and/or cracking. In this manner, the shell and support material can be heated or cooled to control the cooling rate of the print for optimized material properties.

In some alternative embodiments, the filling and shell forming nozzles can be the same nozzle with a varying or adjustable orifice size In yet additional embodiments, the first material can be provided using a material deposition head, fed with a slug stock, filament, granules that are screw fed, hydraulic pressure fluids, curable resins or composites, curable ceramics, concrete, etc.

In yet additional alternative embodiments, the filler and extruder nozzle/hot end can be separate and therefore will not need to be connected on the same end effector In yet additional embodiments, various removable cores can also be used and melted, burned, dissolved, or mechanically removed etc., afterward.

In some embodiments, as discussed above, the filling material can solidify after injection, however in some applications the injected or poured second material can be allowed to remain in its original state, i.e. powder or liquid. Some examples of such applications include, but are not limited to, microcapsules, foam, fillers, powders, working liquids, chocolate liquor etc. Alternative examples can also include batteries, wherein the exterior shell can be an enclosure having anodes and cathodes, terminals etc., wherein the enclosure is then configured to receive a second material, such as an electrolytic fluid such as acid etc., which can then render the battery operable.

In some embodiments, after the creation of the shell, the shell can be provided with one or more additional structures throughout the interior, i.e. infilling the shell with wall supports, tubing, inter-channel connects (heat exchangers) prior to the filling operation.

In some embodiments, the shell can be purged prior to filling and pre-filled with a third material prior to the introduction of the second material. Examples of such can include inert gases. Alternatively, a purging step could also be included which could draw a vacuum so as to prevent oxidation or help with the flowing or drawing of an injected material into the cavity. One particular issue with printing metals is that the metals often oxidize quickly thus causing material and mechanical weaknesses throughout the part. By utilizing the methods of the present disclosure, the shell can be printed from the first material which might be highly susceptible to oxidation. However, the second material, which will likely be the bulk of the material in the part, can then be injected or poured reducing its susceptibility to oxidation, as is common within traditional casting processes, thus reducing the cost of mold formation and part fabrication.

It will be appreciated that the methods discussed herein can also be applied to Powder Bed Additive Material processes where the powders are removed from the shell and new fill materials are added/poured.

It will also be appreciated that the methods disclosed herein can also be applied to SLA resin layering AM processes where the liquid resin is removed from the shell and new fill materials are added/poured.

In some additional embodiments, diffusion materials (or controlled microstructures) can be utilized wherein silicon diffuses out of the shell into the fill material so as to increase the melting temperature and strengthen the shell such that the shell does not deform during pouring/injection and cooling/curing.

In various embodiments, various composites can be utilized of shell materials with high strength and high modulus for lightweight high strength parts (i.e. foam, ceramic, ceramic foams etc.)

It will be further appreciated that various materials or compositions can be printed in one or more desired positions on and/or within the shell so as to provide functionally graded parts as well as embedded parts (i.e. electronic circuitry and components)

In yet additional embodiments, ceramic fibers can be provided to molten metal outer layers with alternative metal matrix composite inner fills.

Also, as discussed briefly above, the methods can also be applied with and used in conjunction with various powdered metallurgy fabrication methods. For example, powders can be poured into the shell then entire piece can be pressurized, heated etc. to solidify the desired part.

In yet additional embodiments the method steps can be performed at varying temperatures through the process and in some instances, the second material can be caused to solidify by freezing the contents of the shell or first material after being allowed to flow thereinto. Some such embodiments can then include a shell formed of a first material, and the second material can be provided as a freezable fluid such as water, wherein the shell can then be removed so as to leave a desired part, such as an ice sculpture.

In yet additional embodiments, the first and second materials can be provided as the same material wherein the variation in properties between the two can be a mere temperature difference, for example the shell can be formed and solidified, wherein the same material can be added to the interior in such a way so as to not destroy the shell. One such example could be printing a shell with super-cooled water, wherein the water freezes in laminated layers upon deposition, the shell can then either be filled slowly or in steps with liquid water in such a manner so as to not melt through the shell as the interior is filled. Alternatively, the shell can be formed, then super-cooled such that the depressed temperature of the shell actually aids in the freezing or solidification of the fill material, even if provided from the same material, but the formation process then causes the difference in characteristics or properties between the shell material and the fill material. Further, in some instances the variation in properties between the two materials can only be during the fabrication process, wherein after solidification and after completion of fabrication continued curing or freezing may cause a progressive homogenization process.

It will be further appreciated that these processes and methods discussed herein can be performed in an enclosed chamber, controlled environments, temperatures, pressure, inert gases, open-air etc., While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Further, discussion with regard to any of the specific features is intended to be for illustrative purposes, with the understanding that any feature discussed herein can be used in combination with any number of other features in any combination. Accordingly, it is not intended that the invention be limited by virtue of the necessity of discussing exemplary embodiments thereof.

Those skilled in the art will recognize improvements and modifications to the preferred embodiments of the present disclosure. All such improvements and modifications are considered within the scope of the concepts disclosed herein and the claims that follow. Additionally, any steps or processes discussed herein are not intended to be restrictive with regard to a particular sequence and those having skill in the art will recognize where certain steps may be performed in various alternative sequences.

The invention claimed is:

1. A fabrication method, comprising the steps of:
   creating a first portion of a physical hollow shell from a first material, the physical hollow shell being formed utilizing a 3-D printing process;
   providing a support material in a granular form about an exterior of the first portion of physical hollow shell formed;
   filling the first portion of the physical hollow shell with a second material, the second material being provided in flowable form;
   creating a second portion of the physical hollow shell using additional first material after at least some volume of the first portion of the physical hollow shell has been filled by the second material;
   providing additional support material in granular form about an exterior of the second portion of physical hollow shell formed; and
   filling the second portion of the physical hollow shell with additional second material after the second portion of the physical hollow shell has been created; and
   allowing the second material to solidify, wherein when the second material to solidify within the hollow shell of the first material causes the first material and the second material to become integrated as a part.

2. The fabrication method of claim 1, further comprising a step of suspending one or more structural reinforcement structures within the part.

3. The fabrication method of claim 1, wherein the hollow shell is formed by providing and bonding a plurality of fused layers.

4. The fabrication method of claim 1, wherein the first material is formed of a polymer or resin.

5. The fabrication method of claim 1, wherein the second material is formed of a polymer or resin.

6. The fabrication method of claim 1, wherein a first nozzle is used to deposit the first material used to form the physical hollow shell, and wherein a second nozzle is used to fill the physical hollow shell with the second material.

7. The fabrication method of claim 1, further including the step of creating at least one vent relief in the physical hollow shell, wherein the vent relief is configured to vent gas generated by or pushed out by the second material during the filling step.

8. The fabrication method of claim 1, wherein the support material is configured to provide thermal insulation to reduce warping or cracking of the physical hollow shell.

* * * * *